United States Patent
Al-Rashid et al.

(10) Patent No.: US 11,814,468 B2
(45) Date of Patent: Nov. 14, 2023

(54) EMULSIFIERS FOR POLYURETHANE BASED FOAM

(71) Applicant: Evonik Operations GmbH, Essen (DE)

(72) Inventors: Jennifer Elizabeth Antoline Al-Rashid, Allentown, PA (US); Udo Banseberg, Stadtlohn (DE); Stephanie Lynne Britton, Allentown, PA (US); Christian Brandl, Hamburg (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/832,034

(22) Filed: Jun. 3, 2022

(65) Prior Publication Data

US 2022/0380517 A1 Dec. 1, 2022

Related U.S. Application Data

(62) Division of application No. 16/344,653, filed as application No. PCT/US2017/061064 on Nov. 10, 2017, now abandoned.

(60) Provisional application No. 62/420,658, filed on Nov. 11, 2016.

(51) Int. Cl.
  *C08G 18/48* (2006.01)
  *C08G 18/28* (2006.01)

(52) U.S. Cl.
  CPC ....... *C08G 18/4829* (2013.01); *C08G 18/283* (2013.01); *C08G 18/4841* (2013.01); *C08G 2110/005* (2021.01); *C08G 2110/0008* (2021.01); *C08G 2110/0083* (2021.01)

(58) Field of Classification Search
  CPC .. C08G 18/10; C08G 18/283; C08G 18/4829; C08G 18/4841; C08G 2110/0008; C08G 2110/005; C08G 2110/0083
  See application file for complete search history.

(56) References Cited

U.S. PATENT DOCUMENTS

| | | | |
|---|---|---|---|
| 4,125,505 A | 11/1978 | Critchfield et al. | |
| 4,673,696 A | 6/1987 | Tsai | |
| 5,344,584 A | 9/1994 | Verhelst et al. | |
| 5,668,187 A | 9/1997 | Asako et al. | |
| 7,223,890 B2 | 5/2007 | Radovich et al. | |
| 8,692,030 B1 * | 4/2014 | Ionescu | C08G 18/485 568/624 |
| 2002/0010224 A1 | 1/2002 | Wilson et al. | |
| 2006/0189704 A1 | 8/2006 | Dexheimer et al. | |
| 2007/0238800 A1 | 10/2007 | Neal et al. | |
| 2008/0009209 A1 | 1/2008 | Clamen et al. | |
| 2012/0202903 A1 | 8/2012 | Andrew et al. | |
| 2014/0364525 A1 | 12/2014 | Su et al. | |

FOREIGN PATENT DOCUMENTS

| | | |
|---|---|---|
| CN | 101054433 A | 10/2007 |
| CN | 103108919 A | 5/2013 |
| CN | 104039854 A | 9/2014 |
| DE | 2341294 A1 | 2/1975 |
| DE | 102008000243 A1 | 8/2009 |
| EP | 1845121 A1 | 10/2007 |
| JP | 2007277560 A | 10/2007 |
| JP | 2013079312 A | 5/2013 |
| JP | 2014508838 * | 4/2014 |
| JP | 2015166472 A | 9/2015 |
| KR | 20070101143 A | 10/2007 |

* cited by examiner

*Primary Examiner* — John M Cooney
(74) *Attorney, Agent, or Firm* — Andrew H. Chung; Linda S. Li; Jason S. Ngui

(57) ABSTRACT

This invention provides stable polyol compositions at all states and these compositions are stable for at least 24 hours, in some cases for more than 6 months. There is also provided polyol mixture compositions that may be uniformly blended under manufacturing conditions within a time period of less than eight hours, typically less than two hours, i.e., stable—polyol mixtures. The invention provides a composition and a method for making stable polyurethane foams. The polyol mixture comprises at least two polyols of different polyoxyethylene content, catalyst, at least one ethoxylated alcohol of the following formula: $RO(CH_2CH_2O)_nH$, wherein R is C1-C31 linear or branched alkyl, n is an integer equal to or greater than 1; and wherein the at least one ethoxylated alcohol has a hydrophilic-lipophilic balance (HLB) value equal to or greater than about 3.7.

2 Claims, No Drawings

EMULSIFIERS FOR POLYURETHANE BASED FOAM

This Application is a divisional application of U.S. Ser. No. 16/344,653, filed Apr. 24, 2019, which is now Abandoned, which is a § 371 national stage of PCT International Application No. PCT/US2017/061064, filed Nov. 10, 2017, which claims the benefit of U.S. Application No. 62/420,658, filed Nov. 11, 2016, the contents of each of which are hereby incorporated by reference in their entirety into this application.

FIELD OF THE INVENTION

This disclosure relates to stable hydrophobic hydrophylic-polyol dispersions, a method of preparing such mixtures, their uses in manufacturing polyurethane foams, and articles made therefrom.

BACKGROUND OF THE INVENTION

Polyurethane foam made from polyols with different hydrophobicity or polarity or polyoxyethylene and polyoxypropylene content, molecular weight, and structure are used in a wide variety of applications ranging from cushioning (such as mattresses, pillows and seat cushions) to packaging, thermal and acoustical insulation, medical applications, and carpet padding in automobiles. The differing hydrophobicity, molecular weight, and structure of the polyols lead to pre-mix system phase separation and foam processing problems such as pinholes, splits, banding, defects and foam collapse when producing the flexible polyurethane foam. The phase separation problem and processing difficulties are resolved when a fatty alcohol ethoxylate is used enabling insitu or in a stable, homogeneous one phase blend of the polyol mixtures or blended components.

U.S. Pat. No. 4,125,505 discloses that polyalkylene oxides having a certain arrangement as one of the polyol components can be improved in their compatibility with an inherently incompatible chain extender, like a low molecular weight polyol, by means of particulated polymers formed from unsaturated monomers such as, for example, styrene-acrylonitrile copolymers. The disadvantages for the polyurethane producer are that the dispersed particles of polymer can sediment out of mixtures, if not used directly, or have an unintended influence on the mechanical properties of the polyurethanes produced therefrom.

U.S. Pat. No. 5,344,584 discloses admixing a mixture of two isocyanate-reactive compounds that are normally not miscible with each other with a surface-active compound which, as carboxylic ester or carboxamide, has acidic groups. The polycarboxylic ester preferably derives from a hydroxycarboxylic acid or from a ring-opened lactone. Adding the surface-active compound to the inherently incompatible polyol components does improve compatibility, but not always to the desired extent. In addition, these polycarboxylic esters are also not universally applicable because of the possible reactivity of their acidic groups.

Limitations are also likely with the use, disclosed in U.S. Pat. No. 4,673,696, of ethylenically unsaturated esterols as compatibilizers between short-chain and long-chain, isocyanate-reactive polyol components which are inherently incompatible with each other. This is particularly because these mixtures can only be used to produce certain polyurethanes where the use of ethylenically unsaturated esterols is unlikely to result in unwanted by-reactions. These compatibilizers are again not always able to provide a compatibility improvement to the desired extent.

DE 10 2008 000 243 describes the use of certain urethane and urea group-containing polyethers as agents for compatibilizing polyol compositions. These compounds are again not always able to provide a compatibility improvement to the desired extent.

DE 23 41 294 describes the use of surface-active inorganic materials for compatibility improvement of a polyol mixture. These solid admixture agents harbor the risk of sedimentation. Moreover, the preferred materials used therein, such as asbestos, constitute an appreciable health risk.

US 2007/238800 describes alkylphenol ethoxylates useful as admixture agents for polyol formulations based on specific plant oil polyols. These emulsifiers not only have to be viewed critically with regard to their health-damaging and ecotoxic properties, but also, in many cases, do not offer adequate stabilizing properties for polyol mixtures.

U.S. Pat. No. 7,223,890 B2 describes an isocyanate-reactive mixture which in addition to water and a DMC-catalyzed alkoxylated polyol contains a compound which has ethylene oxide units and improves the water compatibility of the mixture. Examples mentioned of these compounds include block copolymers of ethylene oxide and propylene oxide. Nothing in the disclosure points to any compatibility improvement of mutually incompatible polyols.

US 2006/0189704 discloses the compatibility improvement, i.e., prevention of phase separation, of compositions containing at least a polyol, water and an alkoxylate with three or more hydroxyl groups of compounds with reactive hydrogen, for example glycerol, as compatibility-improving agents. The presence of these compatibility-improving agents prevents the separation of water and polyol in storage.

US 2008/009209 describes a curable composition containing a polyacid, one or more polyols and also one or more reactive water-repellant agents. Polyalkoxylates of alkyl- and alkenylamines are among the recited examples of water-repellant compounds. These known water-repellant, curable compositions are used for coating glass fibers or mineral wool, while a specific range is recommended for the ratio of carboxyl groups to OH groups in the mixture. Compatibilization of polyol mixtures forms no part of the subject matter of this published US application.

U.S. Pat. No. 5,668,187 B2 discloses the production of rigid polyurethane foam wherein the blowing agent comprises an aqueous emulsion containing a copolymer of various unsaturated monomers in emulsified form being directly added, as further reaction component, in the reaction of polyol with polyisocyanate.

The disclosures of the previously identified patents are hereby incorporated by reference.

Polyurethanes are produced by reaction of OH reactive polyols with at least an isocyanate or polyisocyanates. While the selection of polyisocyanates available on a large industrial scale is limited, there are a multiplicity of polyols or OH active components which can be used. These range from polyether polyols to polyester polyols and hydroxyl-functional polybutadienes to low molecular weight polyols used as chain extenders or chain crosslinkers for example.

Typically, a polyurethane is produced by reacting not just one specific polyol with polyisocyanates, but a mixture of various polyols, which can be of low or comparatively high molecular weight. In many cases, the mixture of polyols used is not stable, but tends to phase separation over time at least. This separation is caused for example by different molecular weights, differing monomeric composition, differing polarity and/or a differing structural arrangement such as, for example, a random or block wise arrangement or a linear or branched structure of the polyols.

Polyurethane foam production involves the accurate pumping, mixing and dispensing of several components or streams into a mold or onto a moving conveyor belt. The number of streams can be from two to >50. However, the typical formulation is composed of two streams consisting of an isocyanate stream and a resin stream. The resin or polyol stream is a mixture of polyether or polyester polyol, crosslinkers (e.g. diethanolamine, glycerol) surfactant, catalyst, water or/and auxiliary blowing agent and other additives. The isocyanate stream comprises toluene diisocyanate, various forms of diphenylmethane diisocyanate, or mixes of the two, or other isocyanate types.

It is further known that the separation tendency is amplified in the presence of certain substances such as water for example. Separation can also be caused or amplified by the use of additives and/or auxiliary agents, or by the presence of more than two polyols during production or as a ready to use mix.

Irrespective of its causes, the tendency to separate leads to diverse problems with the handling and processing of such polyol mixtures. Thus, the storage or transportation of such polyol mixtures or mixing with auxiliary agents even for short periods for example in a mixing head is in many cases not possible because of the separation tendency between the polyols. Therefore, before such polyol mixtures can be processed, the polymer components have to be dispersed stronger or again to ensure homogeneous dispersion of polyol components. This requires the polyurethane producer to invest in mixing equipment which, moreover, leads to increased energy consumption. In addition, there is a risk that insufficient mixing of polyol components causes that the polyurethane produced therefrom will not have the desired performance profile.

BRIEF SUMMARY OF THE INVENTION

This invention solves the above problems by providing stable polyol compositions at all states and these compositions are stable for at least 24 hours, in some cases for more than 6 months among many other objects and benefits.

Another object of this invention is to provide polyol mixture compositions that may be uniformly blended under manufacturing conditions within a time period of less than eight hours, typically less than two hours.

A further object is to provide a method preparing the stable—polyol mixture of the invention.

A further object of this invention is to provide a formulation and a method for making stable polyurethane foams from the invention. In one aspect, this disclosure provides a polyol mixture comprising:
a) at least two polyols of different polyoxyethylene content,
b) a catalyst, and
c) at least one ethoxylated alcohol of the following formula: $RO(CH_2CH_2O)_nH$,
wherein R is C1-C31 linear or branched alkyl,
n is an integer equal to or greater than 1; and
wherein the at least one ethoxylated alcohol has a hydrophilic-lipophilic balance (HLB) value equal to or greater than about 3.7.

In one aspect, this disclosure provides a polyol mixture comprising:
a) at least two polyols of different polyoxyethylene content,
b) a catalyst,
c) at least one ethoxylated alcohol of the following formula: $RO(CH_2CH_2O)_nH$,
wherein R is C9-C15 linear or branched alkyl,
n is an integer equal to or greater than 1 and equal to or less than 10; and
wherein the at least one ethoxylated alcohol having a hydrophilic-lipophilic balance (HLB) value equal to or greater than about 3.7 and equal to or less than 17.9.

In another aspect, this invention discloses a polyol mixture comprising:
a) at least one polyol derived from natural resources and a second polyol containing polyoxylene or a polymeric polyol—with chemical filler types bases like styrene acrylonitrile (SAN) or polyurea dispersions (PHD) or polyisocyanate-polyol additional types (PIPA) or other organic or anorganic fillers,
b) a catalyst,
c) at least one ethoxylated alcohol of the following formula: $RO(CH_2CH_2O)_nH$,
wherein R is C9-C15 linear alkyl,
n is an integer equal to or greater than 1 and equal to or less than 10; and
wherein the at least one ethoxylated alcohol has a hydrophilic-lipophilic balance (HLB) value equal to or greater than about 3.7 and equal to or less than 17.9.

In yet another aspect, this invention provides a method for making the above polyol mixture, such method comprises the following steps:
a) combining at least one polyoxypropylene based polyol and a polyoxyethylene based polyol and at least one ethoxylated alcohol of the following formula:

$RO(CH_2CH_2O)_nH$, wherein R is C1-C31 linear or branched alkyl, n is an integer equal to or greater than 1, and wherein the at least one ethoxylated alcohol has a hydrophilic-lipophilic balance (HLB) value of equal to or greater than about 3.7; and
b) mixing the mixture of step a) until a stable one phase mixture is formed.

In yet another aspect, this invention provides a method for making the above polyol mixture, such method comprises the following steps:
a) combining at least one polyoxypropylene based polyol and a polyoxyethylene based polyol and at least one ethoxylated alcohol of the following formula:

$RO(CH_2CH_2O)_nH$, wherein R is C9-C15 linear or branched alkyl, n is an integer equal to or greater than 1 and less than or equal to 10, and wherein the at least one ethoxylated alcohol has a hydrophilic-lipophilic balance (HLB) value of equal to or greater than about 3.7 and less than or equal to 17.9; and
b) mixing the mixture of step a) until a stable one phase mixture is formed.

In yet another aspect, this invention provides a method for making the above polyol mixture, such method includes the following steps:
a) combining at least one polyoxypropylene based polyol and/or a polyoxyethylene based polyol with a natural resource based polyol and at least one ethoxylated alcohol of the following formula:

$RO(CH_2CH_2O)_nH$, wherein R is C9-C15 linear or branched alkyl, n is an integer equal to or greater than 1 and equal to or less than 10; and wherein the at least one ethoxylated alcohol has a hydrophilic-lipophilic balance (HLB) value of equal to or greater than about 3.7 and less than or equal to 17.9; and
   b) mixing the mixture of step a) until a stable one phase mixture is formed.

Another aspect of the invention relates to a polyurethane foam formulation comprising the polyol mixture disclosed above, along with at least one polyisocyanate at an isocyanate Index from about 80 to about 150, at least one blowing agent, at least one amine catalyst, at least one metal catalyst and at least one silicone surfactant.

In a further aspect, this invention discloses a polyurethane foam made with the previously disclosed foam formulation.

In yet a further aspect, this invention provides a method for preparing a polyurethane foam comprising the following steps:
   a) forming a premix comprising the above-disclosed polyol mixture, at least one blowing agent, at least one amine catalyst, at least one metal catalyst and at least one silicone surfactant; and
   b) contacting the premix with at least one polyisocyanate at an Isocyanate Index from about 80 to about 150.

DETAILED DESCRIPTION OF THE INVENTION

The invention relates to a polyol mixture comprising polyols of different polyoxyethylene and polyoxypropylene content, and at least one ethoxylated alcohol, shown below as formula A. The mixture may remain stable without agitation for at least 24 hours, in some cases more than 6 months or a longer time period. Foam prepared with ethoxylated alcohol of formula A have the added benefit of having higher air flow, better load bearing properties, improved performance on flexible foaming machinery leading to better distribution and improved reactivity.

Ethoxylated Alcohol

The at least one ethoxylated alcohol of the present invention has the following formula A:

$$RO(CH_2CH_2O)_nH \quad\quad\quad A$$

in which R is C1-C31 linear or branched alkyl, inclusive; n is an integer equal to or greater than 1 and less than or equal to 10; and the compound has a hydrophilic-lipophilic balance (HLB) value of equal to or greater than about 3.7 and less than or equal to 17.9.

The term "alkyl" used herein refers to aliphatic hydrocarbon radicals containing only saturated carbon-carbon bonds. Alkyl groups with or without branches and without unsaturated carbon-carbon bonds are suitable for the present invention.

The number "n" of ethoxy units in formula A may be any integer equal to or greater than 1. Non-limiting representative examples include n=1, n=2, n=3, n=6, n=10.

The term "hydrophilic-lipophilic balance (HLB) value" as used herein is a measure of the degree to which a compound is hydrophilic or lipophilic. HLB is calculated using molecular mass of different regions of a molecule, as described by Griffin:

$$HLB=20\times Mh/M$$

wherein Mh is the molecular mass of the hydrophilic portion of the molecule, and M is the molecular mass of the entire molecule, giving a result on an arbitrary scale of 0 to 20.

An HLB value of 0 corresponds to a completely hydrophobic molecule, and a value of 20 corresponds to a completely hydrophilic molecule.

As an example, the HLB value of $C_{13}H_{27}(CH_2CH_2O)_{40}H$ is calculated as the following:

$$HLB=20\times Mh/M=20\times1761/1944=18.1$$

Wherein Mh is the molecular mass of the hydrophilic part $(CH_2CH_2O)_{40}H$ and M is the molecular mass of the entire molecule.

Examples of suitable HLB value for the present invention include, but not limited to HLB value equal to or greater than 3.7, 8, 15.7, 17.9.

Polyol Mixtures

Polyols of different molecular weight or polyoxyethylene and polyoxypropylene content that do not remain a stable one phase mixture may be used in this invention.

The polyol mixture comprises the following polyol (A), the following polyol (B), the following polyol (C), the following polyol (D) and the following polyol (E), and the proportion of the polyisocyanate compound to all active hydrogen-containing compounds in the material is at least 80 by isocyanate index, wherein:

Polyol (A) is a polyether polyol having an average of 2-4 hydroxyl groups and a molecular weight of 2500-5000. Polyols suitable for use in the invention include, as non-limiting examples, polyether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols. These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose.

Polyol (B) is a "polymer polyol" and may be included in a polyol component for use according to the invention. Polymer polyols may be used in polyurethane foams to increase the resistance of the foam to deformation, for example to improve the load-bearing properties of the foam. Depending upon the load-bearing requirements for the polyurethane foam, polymer polyols may comprise from 0 to about 80 percent by weight of the total polyol content. Examples of polymer polyols include, but are not limited to, graft polyols and polyurea modified polyols, both of which are known in the art and are commercially available.

Polyol (C) is a polyether polyol having an average of 2-3 hydroxy groups and a molecular weight between 100-2000.

Polyol (D) is a polyol based on renewable natural resources. Examples of vegetable oils include those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof. Additionally, oils obtained from organisms such as algae may also be used. Examples of animal products include lard, beef tallow, fish oils and mixtures thereof. A combination of vegetable and animal based oils/fats may also be used. For use in the production of polyurethane foams, the natural material may be modified to give the material isocyanate reactive groups or to increase the number of isocyanate reactive groups on the material. Preferably such reactive groups are a hydroxyl group. Several chemistries can be used to prepare the natural oil based polyols. Such modifications of a renewable resource include, for example, epoxidation, hydroxylation, ozonolysis, esterification, hydroformylation, or alkoxylation.

Polyol (E) is polyoxylene polypropylene polyol containing 40-80% polyoxylene content with a molecular weight between 3000 and 6000 and a functionality between 2 and 4.

In one embodiment of the invention the polyol mixture comprises about greater than 0 to about 90 pphp of Polyol A optionally with 0 to 60 pphp of Polyol B optionally with 10 to 40 pphp Polyol D; optionally about 10 to about 90 pphp of Polyol A, or about 10 to about 40 pphp Polyol B with Polyol D at about 20 to about 40 pphp In another embodiment of the invention the polyol mixture comprises about greater than 0 to 90 pphp Polyol A with optionally about 5 to about 50 pphp Polyol C with optionally 20 to 70 pphp Polyol E; or about 10 to about 20 pphp Polyol A optionally with about 5 to 25 pphp Polyol C and optionally about 25 to 60 pphp Polyol E.

In another embodiment of the invention the polyol mixture comprises about greater than 0 to about 90 pphp of Polyol A optionally with 0 to 60 pphp of Polyol B optionally with 10 to 40 pphp Polyol D; optionally about 10 to about 90 pphp of Polyol A, or about 10 to about 40 pphp Polyol B with Polyol D at about 20 to about 40 pphp In another embodiment of the invention the polyol mixture described above is combined with an effective amount of ethoxylated alcohol and mixed until a uniform mixture is formed. Any conventional mixing method, such as mechanical stirring or shaking may be employed. The order of adding polyol and ethoxylated alcohol into polyol does not impact the formation of the stable mixture.

In another embodiment of the invention the method for producing a flexible polyurethane foam which comprises reacting a polyol mixture and an ethoxylated alcohol of the invention described above with a polyisocyanate compound in the presence of a urethane-forming catalyst, a blowing agent and a foam stabilizer.

The polyol mixture is placed still at room temperature (20-25° C.) and its appearance is closely observed. A stable mixture means a mixture without appreciable layer separation to a naked-eye.

An "effective" amount of ethoxylated alcohol is an amount needed to keep the polyol mixture stable for at least 24 hours, in some cases more than 6 months. A polyol mixture may comprise at least about 0.5 pphp, at least about 2.0 pphp or at least about 4.0 pphp ethoxylated alcohol.

Typical manufacturing conditions involve contacting polyol, and ethoxylated alcohol solution of formula A in a blending tank with a capacity of 20 m³ and mixing with a 30 watt mechanical stirrer at about 1800 revolutions per minute (rpm).

Preparation of Foams

Foams or cellular material of any of the various types known in the polyurethane art may be made using the methods of this invention. Typical components of a cellular or noncellular polyurethane formulation include at least one isocyanate reactive polyol or mixtures of it, at least one blowing agent such as water, at least one polyisocyanate, at least one amine catalyst, at least one metal catalyst and at least one silicone surfactant. Other additives and/or an auxiliary agent may be included depending on the types and applications of the polyurethane including, but not limited to, catalysts, carbonates, sulfates, heterocyclic aromatic amides, silicas, phase change or transfer materials, amines, renewable fillers or thermoplastic fillers. For example, flexible polyurethane foams will typically comprise the components shown in Table 1, in the amounts indicated. The components shown in Table 1 will be discussed in detail later.

TABLE 1

Polyurethane Components

| Component | pphp |
|---|---|
| Polyol A | 0-99 |
| Polyol B | 1-60 |
| Polyol C | 1-50 |
| Polyol D | 10-40 |
| Polyol E | 25-65 |
| Water | 0-10 |
| Ethoxylated alcohol | 0.5-4 8 |
| Silicone surfactant | 0-10 |
| Blowing agent | 0-40 |
| Crosslinker | 0-2 |
| Amine catalyst | 0-1.0 |
| Metal catalyst | 0-1.0 |
| Polyisocyanate | To provide NCO index = 70-150 |

The amount of polyisocyanate used in polyurethane formulations according to the invention is not limited, but it will typically be within those ranges known to those of skill in the art. An exemplary range is given in the above table, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula:

NCO index=[NCO/(OH+NH)]×100

In some embodiments of the invention, the catalyst, the blowing agent, the crosslinker, the surfactant and optionally one or more other additives commonly used in polyurethane formation may be combined into the polyol mixture. Such mixtures may subsequently be contacted with an organic isocyanate to form a polyurethane foam, again optionally in the presence of other additives known in the art.

In addition to making flexible foams, the invention may also be used to prepare semi-flexible foams, such as are commonly utilized for many applications in the automotive industry (e.g., instrument panels, headliners and interior trims).

Although specific exemplary types of polyurethane foams are discussed above and elsewhere herein, it is to be understood that polyurethane foams of any type may be prepared according to the invention.

Catalysts

The polyurethane formulation disclosed herein can contain any of the catalysts, and combination of catalysts, known or used for the production of polyurethane foams. Examples of useful catalysts include sodium hydroxide, sodium acetate, tertiary amines or materials which generate tertiary amines such as trimethylamine, triethylene diamine, bis-(dimethylaminoethyl)ether, bis-(dimethyl-(amino-N-propyl)-methylamine, N-methyl morpholine, N,N-dimethyl cyclohexylamine, and N,N-dimethylaminoethanol. Also applicable are metal compounds such as tin alkyl carboxylates, dibutyl tin diacetate, dibutyl tin dioctoate, dibutyl tin dilaurate and stannous octoate. Exemplary catalysts are DABCO 33LV® (Evonik Corp.) and DABCO® T-9 (Evonik Corp.). Many other kinds of catalysts can be substituted for those listed above, if desired. Typically, the loading of catalyst(s) for making a foam according to the invention will be in the range of from greater than 0 to about 2 pphp, more typically from greater than 0 to about 1 pphp, and most typically from greater than 0 to about 0.5 pphp. However, any effective amount may be used. The term "pphp" means weight parts per hundred weight parts of the polyol.

Blowing Agents

Polyurethane foam production may be aided by the inclusion of a blowing agent to produce voids in the polyurethane matrix during polymerization. Any blowing agent known in the art may be used. Suitable blowing agents include compounds with low boiling points which are vaporized during the exothermic polymerization reaction. Such blowing agents are generally inert and therefore do not decompose or react during the polymerization reaction. Examples of inert blowing agents include, but are not limited to, methylene chloride, carbon dioxide, chlorofluorocarbons, hydrogenated fluorocarbons, hydrogenated chlorofluorocarbons, acetone, and low-boiling hydrocarbons such as cyclopentane, isopentane, n-pentane, and their mixtures. Other suitable blowing agents include compounds, for example water, that react with isocyanate compounds to produce a gas.

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates.

Also suitable are "prepolymers" of these isocyanate compounds, comprising a partially pre-reacted mixture of a polyisocyanate and a polyether or polyester polyol to convert one or more hydroxyls on the polyester polyol to substituted carbamate groups. Suitable prepolymers derived from polyether and polyester polyols are well known in the art.

Other Optional Components

A variety of other ingredients may be included in the formulations for making foams according to the invention. Examples of optional components include, but are not limited to, cell stabilizers, crosslinking agents, chain extenders, pigments, fillers, prepolymerised reaction products and combinations of any of these.

Practice of this invention may allow polyurethane manufacturers to realize one or more advantages. These may include a) reduced time and energy required to form polyol mixtures that may be readily used in polyurethane production; b) stable polyol mixtures that allow more time for processing other components for making polyurethane; c) polyurethane foam produced with this invention demonstrates higher airflow d) other physical properties of the produced foam are not adversely affected by employing this invention.

The invention is further described in the context of the following Examples, which are presented by way of illustration, not of limitation.

The present invention is directed to a composition comprising a) at least one isocyanate reactive polyol, and b) at least one ethoxylated alcohol of the following formula: $RO(CH_2CH_2O)_nH$, wherein R is C1-C31 linear or branched alkyl, n is an integer equal to or greater than 1 and wherein the at least one ethoxylated alcohol has a hydrophilic-lipophilic balance (HLB) value of equal to or greater than about 15.7.

The present invention is also directed to a method to make a cellular or noncellular polyurethane by reacting the composition with at least one isocyanate.

Preferably, the reacting composition comprises at least one additional additive and/or an auxiliary agent from the group consisting of catalysts, carbonates, sulfates, heterocyclic aromatic amides, silicas, phase change or transfer materials, amines, renewable fillers or thermoplastic fillers.

The present invention is also directed to a polyol mixture comprising a) at least two polyols of different polyoxyethylene content, b) a catalyst, and c) at least one ethoxylated alcohol of the following formula: $RO(CH_2CH_2O)_nH$, wherein R is C1-C31 linear or branched alkyl, n is an integer equal to or greater than 1; and wherein the at least one ethoxylated alcohol has a hydrophilic-lipophilic balance (HLB) value of equal to or greater than about 3.7.

Preferably, R is C9-C15 linear or branched alkyl, n is an integer equal to or greater than 1 and equal to or less than 10; and wherein the at least one ethoxylated alcohol has a hydrophilic-lipophilic balance (HLB) value of equal to or greater than about 3.7 and equal to or less than 17.9.

Preferably, at least one polyol is derived from natural resources and a second polyol containing polyoxylene or a polymeric polyol.

The present invention is also directed to a method for preparing a polyol mixture comprising the steps of a) combining at least one polyoxypropylene based polyol and a polyoxyethylene based polyol and at least one ethoxylated alcohol of the following formula: $RO(CH_2CH_2O)_nH$, wherein R is C1-C31 linear or branched alkyl, n is an integer equal to or greater than 1, and wherein the at least one ethoxylated alcohol has a hydrophilic-lipophilic balance (HLB) value of equal to or greater than about 3.7; and b) mixing the mixture of step a) until a stable one phase mixture is formed.

Preferably, R is C9-C15 linear or branched alkyl, n is an integer equal to or greater than 1 and less than or equal to 10, and wherein the at least one ethoxylated alcohol has a hydrophilic-lipophilic balance (HLB) value of equal to or greater than about 3.7 and less than or equal to 17.9.

Preferably, the polyoxyethylene based polyol and polyoxyethylene based polyol is further combined with a natural resource based polyol.

The present invention is also directed to a polyurethane foam composition comprising a polyol mixture comprising a) at least two polyols of different polyoxyethylene content, b) a catalyst, and c) at least one ethoxylated alcohol of the following formula: $RO(CH_2CH_2O)_nH$, wherein R is C1-C31 linear or branched alkyl, n is an integer equal to or greater than 1, and wherein the at least one ethoxylated alcohol has a hydrophilic-lipophilic balance (HLB) value of equal to or greater than about 3.7; at least one polyisocyanate at an Isocyanate Index from about 80 to about 150, at least one blowing agent, at least one amine catalyst, at least one metal catalyst, and at least one silicone surfactant.

Preferably, the polyurethane foam composition comprises a polyol mixture wherein R is C9-C15 linear or branched alkyl, n is an integer equal to or greater than 1 and equal to or less than 10; and wherein the at least one ethoxylated alcohol has a hydrophilic-lipophilic balance (HLB) value of equal to or greater than about 3.7 and equal to or less than 17.9.

Preferably, the polyurethane foam composition comprises a polyol mixture wherein at least one polyol is derived from natural resources and a second polyol containing polyoxylene or a polymeric polyol.

Preferably, the polyurethane foam composition further comprises at least one additional additive and/or an auxiliary agent from the group consisting of catalysts, carbonates, sulfates, heterocyclic aromatic amides, silicas, phase change or transfer materials, amines, renewable fillers or thermoplastic fillers.

The present invention is also directed to a method for preparing polyurethane foam comprising the steps of a) forming a premix comprising a polyol mixture, at least one blowing agent, at least one amine catalyst, at least one metal catalyst, and at least one silicone surfactant; and b) contacting the premix with at least one isocyanate at an Isocyanate Index from about 80 to about 150.

EXAMPLES

Example 1

Stability of Natural Oil-Polyol and Polyether Polyol Mixtures

Natural oil polyol and polyether polyol mixtures were prepared using the following procedure at room temperature (20-25° C.). To a beaker of 1000 mL was added 20-80 g polyol (A), 0-60 g polyol B, 20-80 g of polyol (D), catalyst, surfactant, and various amounts ethoxylated alcohols being tested. The amounts of the components are shown in Table 2. The mixture was then stirred using a mechanical stirrer with a diameter of 90 mm at 1150 rpm for 60 seconds or until a uniform mixture was formed. The mixture was then transferred to a glass vial of 20 mL and the vial was placed still for up to 6 months. The vial was visually checked periodically for any layer separation in the mixture. If any of the above phenomena were observed, the dispersion would be recorded as unstable; otherwise, the dispersion was recorded as stable. The stability results are listed in Table 3.

TABLE 2

| Raw Material | pphp |
|---|---|
| Polyol A | 60-90 |
| Polyol B | 0-60 |
| Polyol D | 10-40 |
| SH301 | 0.6 |
| DEOA-LF | 1.5 |
| DC5164 | 0.4 |
| 33LX | 0.3 |
| BLX11 | 0.08 |
| Water | 2.8 |
| Ethoxylate alcohol | 1-4 |

TABLE 3

Stability Results

| Sample | Ethoxylated Alcohol | R | Avg. n | HLB | Amount (pphp) | Polyol A/Polyol D ratio | Mixture Stable after 24 hours | Mixture stable after 6 months |
|---|---|---|---|---|---|---|---|---|
| 1 | Tomadol ® 901 | C9-C11 |  | 12 | 2.0 | 3/2 | Yes | Yes |
| 2 | Tomadol ® 23-1 | C12-C13 | 1 | 3.7 | 2.0 | 2/3 | Yes | Yes |
| 3 | Tomadol ® 91-2.5 | C9-C11 | 2.7 | 8.5 | 2.0 | 3/2 | Yes | Yes |
| 4 | Tomadol ® 1-3 | C11 | 3 | 8.7 | 4.0 | 3/2 | Yes | Yes |
| 5 | Exxal 13 | C12-C13 | 0 |  | 4.0 | 3/2 | No | No |
| 6 | PEG 200 |  |  | 18 |  | 3/2 | No | No |
| 7 | SPAN 80 |  |  |  | 4 | 3/2 | No | No |

Example 2

Stability Test of Polyols with Different Molecular Weights and Polyoxylene Content Ethoxylated alcohols with different alkyl groups, ethoxy units and therefore distinct HLB values were employed to prepare polyol mixtures according to the procedure of Example 1. The amounts of the components in the polyol mixture are shown in Table 4. The effects of the ethoxylated alcohols on the stability of the formed mixtures were compared following the visual check method of Example 1 and the results are listed in Table 5. All ethoxylated alcohols tested fit the following formula:

$RO(CH_2CH_2O)_nH$, in which R is a linear or branched alkyl and n is an integer equal to or greater than 1 and equal to or less than 10.

TABLE 4

| Formulation | |
| --- | --- |
| Component | pphp |
| Polyol C | 5-50 |
| Polyol E | 25-65 |
| Polyol A | 10-40 |
| Chain extender | 0.75 |
| Water | 1.5-4 |
| Silicone Surfactant | 0.5-1.5 |
| Dabco ® BL11 | 0.07 |
| Dabco 33LV ® | 0.2 |
| T9 | 0.05 |
| Ethoxylated alcohol | 0.5-4 |

TABLE 5

Stability of Hydrophobic and Hydrophilic Polyol Mixtures with Ethoxylated Alcohols

| Sample | Ethoxylated Alcohol | R | Avg. n | HLB | Amount (pphp) | Polyol Stable 24 hours | Polyol Stable 3 weeks |
| --- | --- | --- | --- | --- | --- | --- | --- |
| Control | — | — | — | — | — | No | No |
| 1 | Tomadol ® 23-1 | C12-C13 | 1 | 3.7 | 0.5-2.0 | Yes | Yes |
| 2 | Tomadol ® 1-3 | C11-C13 | 3 | 8.7 | 0.5-2.0 | Yes | Yes |
| 3 | Tomadol ® 901 | C9-C11 | | 12 | 0.5-2.0 | Yes | Yes |
| 4 | Tomadol 900 | C9-C11 | | 13.1 | 2 | Yes | Yes |
| 5 | Propetal 160 | Fatty alcohol polyalkylene glycol ether | | | 0.5-2.0 | Yes | No |
| 6 | PEG 200 | C8 | | | 0.5-2.0 | Yes | No |
| 7 | Neodol 91 | | | | 0.5-2.0 | Yes | No |
| 8 | Genapol PF 20 | EO/PO block copolymer 40% Eo | | 4 | 0.5-2.0 | No | No |
| 9 | Genapol LA70 | C12-C14 Fatty alcohol ethoxylate with | | 13 | 0.5-2.0 | No | No |
| 10 | Disperbyk | Anionic agent | | | 0.5-2.0 | Yes | No |
| 11 | Genapol O 20 | C6-C10 Fatty Alcohol | | 5 | 0.5-2.0 | No | No |

Tomadol® 23-1, Tomadol® 1-3, Tomadol® 900 and Tomadol® 901 were from Evonik Corp. Propetal 160 a Fatty alcohol polyalkylene glycol ether was from Zschimmer and Schwarz, Polyethylene glycol polymer with MW from 200-5000, and Neodol 91 was from Shell Chemical. Samples 1-4 may contain mixtures of compounds with structures falling within the scope of the specified "R" and "Avg. n". "R" designates the range of carbon numbers of the linear alkyl group and "Avg. n" is the range or average number of ethoxy units in each sample. Genapol types were products of Clairant.

A polyol mixture without any ethoxylated alcohol became unstable in less than 2 hours. Other compounds, such as CARBOWAX™ Polyethylene Glycol (PEG) 200 from Dow Chemical with a formula of $HO-(CH_2CH_2O)_4H$ did not stabilize polyol mixtures when combined thereinto.

This example illustrates that only ethoxylated alcohols satisfying certain structural requirements may stabilize hydrophobic and hydrophilic polyol dispersions for at least 24 hours.

Example 3

Physical Properties of Polyurethane Foams Made with and without Ethoxylated Alcohols Physical properties were measured according to ASTM 3574. Physical properties of Sample 1 of Example 1 were measured and are presented in Table 6.

TABLE 6

| Physical Properties of Polyurethane Sample 1 | | | | |
| --- | --- | --- | --- | --- |
| Measurement (units) | No Additive | 2 pphp | 4 pphp | 6 pphp |
| Airflow (L/M) | 70.0 | 74.7 | 88.4 | 90.1 |
| Core Density (kg/m$^3$) | 41.0 | 41.4 | 41.9 | 42.0 |
| Tensile (kPa) | 114.8 | 116.8 | 111.1 | 112.6 |
| Elongation (%) | 107.0 | 108.0 | 113.7 | 111.4 |
| Tear (N/m) | 237.3 | 239.9 | 253.8 | 245.0 |

The data in Table 6 indicates that the inclusion of ethoxylated alcohol of the invention does not affect foaming kinetics. It also does not adversely affect the physical properties of the resulted polyurethane foams.

Example 4

Ethoxylated alcohols with different alkyl groups, ethoxy units and therefore distinct HLB values were employed to prepare a polyol mixture of 50 wt % Polyol A and 50 wt %

Polyol C according to the procedure of Example 1. Their effects on the stability of the formed mixtures were compared following the visual check method of Example 1 and the results are listed in Table 7. All ethoxylated alcohols tested fit the following formula:

RO(CH$_2$CH$_2$O)$_n$H, in which R is a linear or branched alkyl and n is an integer equal to or greater than 1 and equal to or less than 10.

cations may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

TABLE 7

| Raw material name | Description | Test 1 | Test 2 | Test 3 | Test 4 | Test 5 | Test 6 | Test 7 | Test 8 | Test 9 | Test 10 | Test 11 | Test 12 | Test 13 | Test 14 | Test 15 |
|---|---|---|---|---|---|---|---|---|---|---|---|---|---|---|---|---|
| Voranol 3322 | Polyether triol based on gylcol 3600MW Random | 50 | 50 | 50 | 50 | 50 | 50 | 50 | 50 | 50 | 50 | 50 | 50 | 50 | 50 | 50 |
| Alcupol F 3231 | Polyether triol based on gylcol 4500 MW 70% EO | 50 | 50 | 50 | 50 | 50 | 50 | 50 | 50 | 50 | 50 | 50 | 50 | 50 | 50 | 50 |
| Voranol 3138 | Polyether triol based on gylcol 3000MW PO | | | | | | | | | | | | | | | |
| Control PE 40 | | | 2 | | | | | | | | | | | | | |
| BYK 307 | Polyalkylenpolydimethylsiloxane for wetting and dispersing | | | 2 | | | | | | | | | | | | |
| Genapol PF 20 | Nonionic EO/PO Blockpolymer 20% EO | | | | | 2 | | | | | | | | | | |
| Genapol PF 40 | Nonionic EO/PO Blockpolymer 40% EO | | | | | | 2 | | | | | | | | | |
| Genapol EA030 | C12/C14 fatty alcohol ethoxylate with 3 EO | | | | | | | 2 | | | | | | | | |
| Genapol EA080 | C12/C14 fatty alcohol ethoxylate with 7 EO | | | | | | | | 2 | | | | | | | |
| Propetal 160 | Nonionic EO/PO Blockpolymer 16-20% EO | | | | | | | | | 2 | | | | | | |
| Tomadol 1-3 | | | | | | | | | | | 2 | | | | | |
| Tomadol 23-6.5 | | | | | | | | | | | | 2 | | | | |
| Tomadol 900 | | | | | | | | | | | | | 2 | | | |
| Tomadol 91-6 | | | | | | | | | | | | | | 2 | | |
| Rewopol SB DO 75PG | Aqueous solution of sodium diisooctylsulfosuccinate. | | | | | | | | | | | | | 2 | | |
| MH1000 | Alkoxy Polyether 100MW | | | | | | | | | | | | | | 2 | |
| Tomadol 400 | | | | | | | | | | | | | | | | 2 |

Mixing procedure

All compoents are weighed into a PE 350 ml Beaker and mixed with a 4 cm diameter disk for 30 s. Then the dispersed mixture is put into a glass tube and stored at 23° C. 50% humidity

| Stability test time | | | | | | | | | | | | | | | | |
|---|---|---|---|---|---|---|---|---|---|---|---|---|---|---|---|---|
| 1 h | 1 h | yes | no | yes | yes | yes | no | no | no | no | no | no | yes | no | no | no |
| 2 h | 2 h | yes | no | yes | yes | yes | no | no | no | no | no | no | yes | no | no | no |
| 4 h | 4 h | yes | no | yes | yes | yes | no | no | no | no | no | no | yes | no | no | no |
| 1 day | 1 day | yes | no | yes | yes | yes | yes | yes | yes | yes | yes | yes | yes | yes | yes | yes |
| 2 days | 2 days | yes | no | yes | yes | yes | yes | yes | yes | yes | yes | yes | yes | yes | yes | yes |
| 1 week | 2 week | yes | no | yes | yes | yes | yes | yes | yes | yes | yes | yes | yes | yes | yes | yes |
| 1 month | 1 month | yes | no | yes | yes | yes | yes | yes | yes | yes | yes | yes | yes | yes | yes | yes |
| 2 month | 2 month | yes | no | yes | yes | yes | yes | yes | yes | yes | yes | yes | yes | yes | yes | yes |
| 3 month | 3 month | yes | no | yes | yes | yes | yes | yes | yes | yes | yes | yes | yes | yes | yes | yes |

While the invention has been described with reference to the above Examples, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for preparing a polyol mixture comprising the steps of
   a) combining at least polyoxypropylene based poly and art polyoxyethylene based polyol that have different polyoxyethylene contents, with a natural resource based polyol, wherein the natural resource of the natural resource based polyol is a vegetable oil and/or an animal product selected from the group consisting of lard, beef tallow, and fish oils, and at least one ethoxylated alcohol of the following formula: $RO(CH_2CH_2O)_nH$, wherein R is C9-C15 linear or branched alkyl, n is an integer equal to or greater than 1 and equal to or less than 10, wherein the at least one ethoxylated alcohol has a hydrophilic-lipophilic balance (HLB) value of equal to or greater than about 3.7 and equal to or less than 17.9, wherein the at least one polyoxypropylene based polyol and polyoxyethylene based polyol are present in an amount between 60 pphp to 90 pphp; wherein the natural resource based polyol is present in an amount between 10 pphp to 40 pphp, and wherein the at least one ethoxylated alcohol is present in an amount between 1 pphp to 4 pphp; and b) mixing the mixture of step a) until a stable one phase mixture is formed.

2. The method of claim 1, wherein the natural resource is a vegetable oil selected from the group consisting of castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, and jatropha seed oils.

* * * * *